Nov. 2, 1965  M. G. GABRIEL ETAL  3,214,912
HYDRODYNAMIC TORQUE TRANSMITTING ASSEMBLY
Filed Dec. 23, 1963
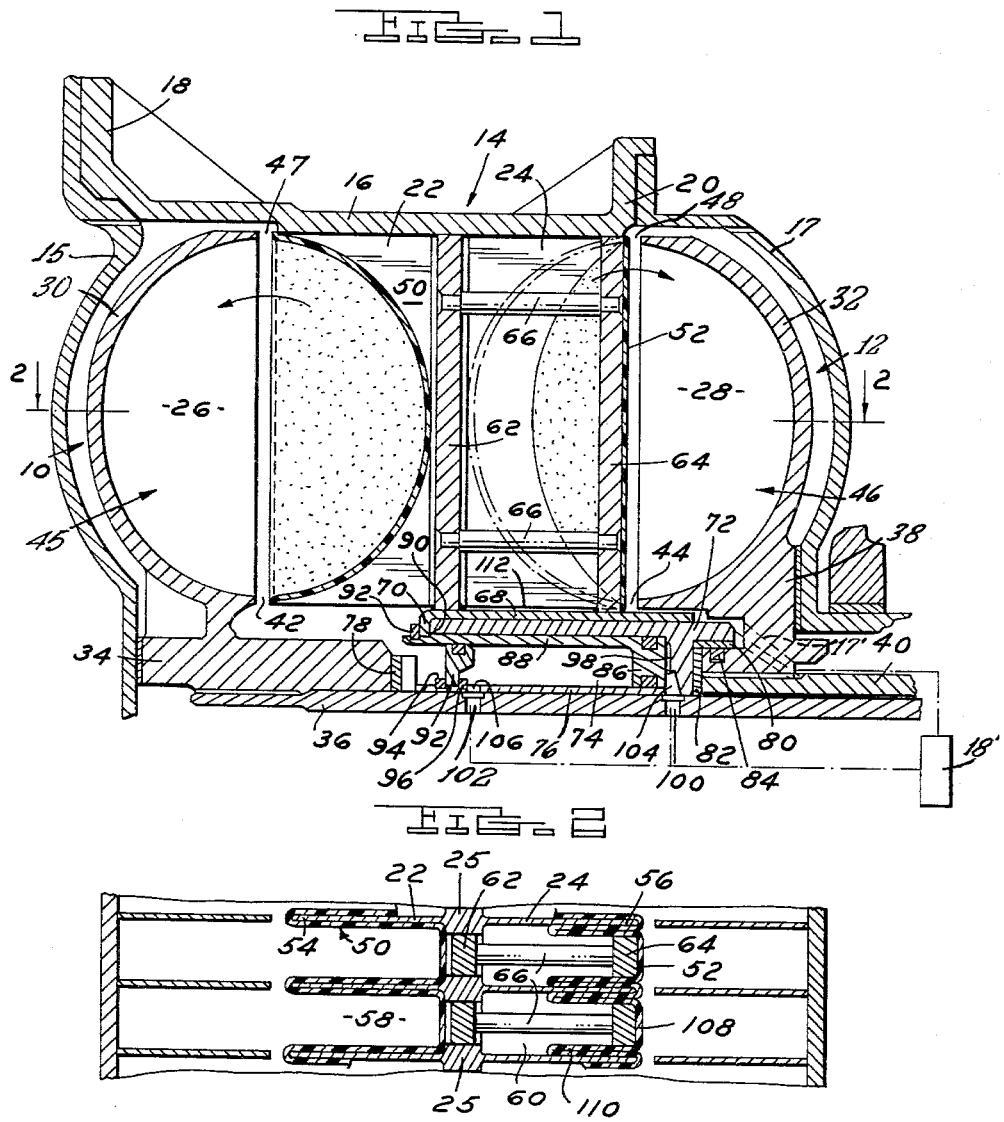
MARTIN G. GABRIEL
NORMAN W. VANHUSEN
INVENTORS
BY John R. Faulkner
Robert E. McCollum
ATTORNEYS

United States Patent Office 3,214,912
Patented Nov. 2, 1965

3,214,912
HYDRODYNAMIC TORQUE TRANSMITTING
ASSEMBLY
Martin G. Gabriel, Dearborn, and Norman W. Van Husen, Detroit, Mich., assignors to Ford Motor Company, Dearborn, Mich., a corporation of Delaware
Filed Dec. 23, 1963, Ser. No. 332,789
9 Claims. (Cl. 60—54)

This invention relates to a hydrodynamic torque transmitting mechanism. More particularly, it relates to a torque transmitting assembly consisting of a plurality of adjacent hydrodynamic drive devices selectively operable to transmit torque between a number of rotating shafts. The invention is particularly adapted for use with a transmission for an automotive vehicle to selectively establish a number of power paths from an engine to the transmission gearing. The invention, however, will have use in many other installations where the selective drive of a plurality of shafts from a single shaft is desired, or vice versa; that is, the selective drive of a single shaft from any one of a number of power input shafts.

In the field of motor vehicle transmissions, it is known to use a number of hydrodynamic drive devices, such as, for example, fluid couplings, torque converters, or the like, that are selectively filled or emptied of operating fluid to establish a driveline from one or more power sources to different portions of the transmission. Normally, however, these hydraulic drive devices are completely emptied of operating fluid to interrupt the transmission of torque through them, and then refilled to render the devices operative. To meet these fluid requirements necessitates the use of a main fluid supply pump having a large capacity. Since the manufacturing costs of a pump increase as a function of its capacity, a larger pump adds considerably to the overall cost of the transmission package.

The invention provides a multiple fluid coupling construction wherein the couplings remain filled with fluid at all times, whether they are operable or inoperable to transmit torque. Control of the operation of the couplings is provided by means that moves into or out of the fluid circuit of each coupling to control the fluid circulation, and, thereby, the transmission of torque through the device. Also, this latter means is such that as one coupling becomes operative, the remaining of the couplings become inoperative. Since the couplings remain filled at all times, the fluid requirements are lessened, and a fluid pressure supply pump of smaller capacity than normally would be required in the case of fill and empty type couplings, is adequate. The overall manufacturing costs are thereby reduced, and control of the selectivity of the couplings is simplified.

The invention accomplishes the above objectives by providing a flexible diaphragm that is adapted at times to bridge the circumferential distance between the peripheral axial edge portions of adjacent blades on one of the rotating elments of the couplings. The diaphragm is movable progressively to a position adjacent the hub of the rotating element, where it is in an inoperative position and effectively out of the fluid circuit of that particular coupling. The coupling at this time operates in a normal manner to transmit torque between two members. In its alternate extreme position, the diaphragm is adjacent the outer peripheries of the blades to cover the gap between them and thereby block the circulation of fluid. The transmission of torque by the coupling is thus prevented.

A flexible diaphragm is positioned for cooperation with each coupling, and the diaphragms are interconnected so that as one moves into the circuit of one coupling to block the fluid circulation, the adjacent coupling diaphragm is moved out of the associated fluid circuit to condition it for normal torque transmitting operation. This operation is accomplished in a progressive manner assuring the smooth interruption or establishment of the torque transmitting phases.

It is one of the objects of the invention, therefore, to provide a hydrodynamic drive device with means selectively movable into the fluid circuit of the device to block the circulation of fluid through it and interrupt the transmission of torque between its rotating elements.

It is another object of the invention to provide a hydraulic torque transmitting apparatus consisting of a number of associated hydrodynamic drive devices provided with means operable to progressively interrupt the transmission of torque through any one of the drive devices, while simultaneously and progressively conditioning the remaining drive devices for normal torque transmitting operation.

It is another object of the invention to provide a torque transmitting assembly consisting of adjacent fluid couplings that are constantly filled with operating fluid, each of which is provided with a flexible diaphragm. The diaphragm is movable to a position effectively covering one of the coupling rotating elements to interrupt the transmission of torque through it by blocking circulation of fluid flow, or is moved to an inoperative position effectively out of the fluid circuit to permit normal operation of the coupling.

It is also an object of the invention to interconnect the diaphragms of all of the couplings in a manner to provide alternate or joint operation of the couplings.

Other objects, features, and advantages of the invention will become apparent upon reference to the succeeding, detailed description thereof, and to the drawing illustrating the preferred embodiment thereof; wherein, FIGURE 1 is a cross-sectional view of a portion of one-half of a hydraulic torque transmitting assembly embodying the invention; and, FIGURE 2 is a cross-sectional view of a portion of the torque transmitting assembly of FIGURE 1 taken on a plane indicated by and viewed in the direction of the arrows 2—2 of FIGURE 1.

FIGURE 1 shows the upper half of a hydrodynamic torque transmitting assembly consisting of two fluid couplings 10 and 12 arranged in a side-by-side manner and having a common impeller unit 14. The couplings are enclosed by an annular impeller and coupling housing consisting of sections 15, 16 and 17. The forward or left-hand portion of the housing 16 has annular radial flanges 18 adapted to be bolted or otherwise secured to a conventional engine flywheel (not shown) providing a power input source. The rearward edge of portion 16 has an annular radial flange 20 connected to the housing portion 17. Housing portion 17 is journaled on a part of the stationary transmission case, as shown, and is adapted to drive the rotor of a fluid pressure supply pump (not shown) to provide the necessary fluid requirements of the couplings and other fluid pressure actuated devices to be described. The impeller and coupling housing as a whole defines a fluid chamber in which the couplings 10 and 12 operate, and is filled with fluid at all times through a bore 17′ from the supply indicated schematically at 18′.

Cover section 16 constitutes a support for the double impeller unit 14. The impeller consists of two integral rows of circumferentially spaced impeller or pump blades 22 and 24 extending laterally or axially from opposite sides of radially extending base members 25. The desired circumferential spacing may be established by any suitable means, such as, for example, by casting the impeller integral with the cover 16; or welding, bolting, or securing the blades and bases to the cover by tabs (not shown). Each of the impeller blade sets 22 and 24 faces a similar row or set of turbine blades 26 and 28 suitably secured within annular outer shroud members 30 and 32. The hub 34 of shroud 30 is splined to one end of a sleeve shaft 36, while hub 38 of shroud 32 is similarly connected to a sleeve shaft 40 rotatably surrounding shaft 36.

Both of the couplings 10 and 12 are of the constant flow type, being supplied with operating fluid at all times at their inner peripheries through inlets 42 and 44. The inlets are connected to each other through the clearance space 112 between the inner ends of the pump blades 22 and 24 and an annulus 68 (to be described), and through bore 17′ to the fluid pressure pump previously described. The fluid fills the coupling operating chambers 45 and 46, and circulates in the direction of the arrows. It is discharged continuously through the controlled outer peripheral outlets 47 and 48 into the space between the housing portions and the shrouds 30 and 32. This continuous flow of fluid not only maintains the couplings filled at all times, but cools the fluid as well.

Rotation of the impeller blades 22 and 24, upon rotation of the cover 16, causes a toroidal circulation of flow of the fluid within each of the coupling operating chambers 45 and 46 in a known manner. The fluid exiting form the impeller blades impinges upon the turbine blades 26 and 28 and causes them to rotate in the same direction.

The outer shrouds 30 and 32 define one-half of the toroidal path for the circulation of fluid. The other half is defined by a rubber-like, flexible membrane or diaphragm 50 and 52 that alternately hugs the faces of the blades of or covers each of the groups of impeller blades 22 and 24. The membrane is bonded to the blade axial edges 54 and 56, and is circumferentially continuous to extend across the spaces 58 and 60 between blades. Each of the membranes, in its expanded or extended position, has substantially a dish shape in cross section, as seen in FIGURE 1, to define a semi-toroidal shell for co-operation of one coupling unit at a time, or partial opera- of the membranes is flexible so that the normal operating fluid pressure forces prevalent in the coupling chambers force it into the expanded position, illustrating by membrane 50, for example, to complete the outer shroud for the impeller blades 22 or 24. The coupling 10 then operates in a normal manner as if the membrane were a rigid element, to effect the transmission of torque from the cover 16 to shaft 36 in an efficient manner.

As stated previously, the invention provides for the operation of one coupling unit at a time, or partial operation of both simultaneously, to effect a drive of either of shafts 36 or 40 alone, or both together. The first operation is accomplished by moving one of the membrane portions 50 or 52 into the fluid circuit of the coupling with which it is associated to effectively cover or span the distance between the outer edge of the impeller blades of that coupling, and thereby interrupt or block the circulation of fluid therethrough. Simultaneously, the membrane secured to the opposite coupling impeller blades is withdrawn from the fluid circuit to permit the coupling to operate in the normal manner. Torque thus can be transmitted through the latter coupling, and is prevented from being transmitted through the former coupling.

Each of the circumferential spaces between the impeller base elements 25 slidably receives one of a pair of axially spaced movable actuators 62 and 64. The actuators extend radially, and are integrally connected for unitary movement by a pair of spaced pins 66. The axial spacing is such as to position the actuator 62 as shown in FIGURE 2 when the actuator 64 is adjacent the axial extremities of the impeller blades 24.

The actuators are welded or otherwise secured at their inner edge portions (FIGURE 1) to a drum-like base 68 having a radial flange 70. The base is rotatably and slidably mounted on a stationary support 72 that has substantially a U-shape in cross section providing a recess 74. The hub portion 76 of the support is journaled for rotatably supporting shaft 36. The hub 34 of turbine shroud 30 is located axially with respect to the edge of hub 76 by a thrust washer 78. The hub 38 of turbine shroud 32 is similarly rotatably and sealingly supported upon support 72 by bearing and seal members 80, 82 and 84.

The support recess 74 slidably receives an annular fluid pressure actuated piston 86 having an axial extension 88. The extension has a stepped portion 90 that abuts the edge of flange 70 and is held thereagainst by a snap ring 92, thus providing unitary movement of base 68, the actuators 62 and 64, and piston 86. Recess 74 is closed at its open end by an annular end plate or stop 92 having a sealed fit with the flange 88. The end plate is located axially on the hub 76 between snap rings 94 and 96.

The support 72 is further bored to a smaller diameter at one end to provide a chamber 98 adapted to receive fluid under pressure to actuate the piston 86. The fluid may be supplied from any suitable source, such as the fluid pump described. It is directed alternately through suitable bores 100 or 102, in shaft 36, and bores 104 or 106, in support 72, to opposite sides of the piston 86 to effect its axial movement in one direction or the other.

In the extreme positions of the actuators 62 and 64 shown in FIGURES 1 and 2, the actuator 62 has moved out of contact with the membrane 50, causing it to be forced to the extended shape shown by the pressure of the operating fluid in coupling 10. The movement of the membrane to this position has effectively withdrawn it from the fluid circuit of coupling 10, permitting this coupling 10 to operate in a normal manner to transmit torque from cover 16 to shaft 36. At the same time, on the other hand, the circumferential bridging portions 108 of membrane 52 have been engaged by the actuators 64 and moved axially to the position shown, folding the membrane back upon itself to a double thickness, as shown at 110. In this position, membrane 52 becomes a cover extending across the entire row of impeller blades 24, and effectively blocks any circulation of fluid between blades 24 and turbine blades 28. The transmission of torque from cover 16 to shaft 40 is thus prevented.

The operation is believed to be clear from the above description and a consideration of the drawings. With the parts in the positions shown, clockwise (out of the plane of FIGURE 1) rotation of cover 16 rotates the impeller blades 22 and 24 in the same direction. Since the coupling operating chambers 45 and 46 are constantly filled with fluid, circulation of fluid occurs in a counter-clockwise direction from the impeller blades 22 to the turbine blades 26, and shaft 36 is gradually brought up to a speed approximating that of cover 16.

Coupling 12 at this time, however, is inoperative to transmit torque to shaft 40 because the membrane 52 effectively blocks the fluid discharge from blades 24 and therefore prevents any circulation of flow through the coupling 12. Without circulation, the shaft 40 remains stationary.

When it is desired to activate coupling 12 and deactivate coupling 10, fluid under pressure is admitted through bores 100 and 104 into chamber 98 to act against piston 86, moving it progressively to the left, as seen in FIGURE 1. Immediately, actuator 62 engages or contacts the membrane 50, and begins moving it leftwardly, folding it back upon itself in the same manner as illustrated in FIGURE 2 by the double fold 110. This action will continue until the base of membrane 50 assumes its outer axial position and shape similar to that illustrated by portion 108 of membrane 52. At this time, it effectively blocks any circulation of fluid between the pump blades 22 and the turbine blades 26. The clearance 112 between the inner ends of the pump blades 22 and 24 and the annulus 68 provides a passage for the communication of fluid between the two operating chambers 45 and 46 when fluid is displaced by movement of the diaphragms. Other suitable slots in the bases of the actuators 62 and 64 can be provided, if deemed necessary or desirable.

Simultaneously, the actuator 64 has moved progressively to the left of the figures, permitting the operating fluid under pressure in chamber 45 to unfold the membrane 52 to its fully expanded position similar to that illustrated in FIGURE 1 by the membrane 50. At this point, coupling 12 is totally operative to transmit the torque of cover 16 to the shaft 40, while coupling 10 is inoperative.

It is to be noted that the membranes 50 and 52, during their folding and unfolding operations, not only serve to block the circulation of flow, but also aid in the guiding of the actuators 62 and 64 during their axial movements. Also, since the movement of piston 86 is progressive, it provides a progressive deactivation of one coupling with a corresponding progressive activation of the opposite coupling. This action provides an extremely smooth changeover from the operation of one coupling to the other, and permits the changeover to occur without undue concern as to the speed of rotation of cover 16. It should be noted also that the piston 86 can be stopped in a position midway between its extreme movements, when it is desired to transmit torque partially through both of the couplings at the same time.

From the foregoing, therefore, it will be seen that the invention provides a hydraulic torque transmitting construction that permits the selective operation of one or the other of a number of fluid couplings, or partial operation of both, merely by the axial movement of interconnected flexible membranes or diaphragms attached to the impeller blades. It will also be seen that the invention makes it possible to effectively terminate the operation of a coupling without emptying its operating chamber of fluid, thereby reducing the supply pump capacity requirements. It will also be seen that the invention provides a simplified means for progressively terminating the operation of one fluid coupling while progressively rendering the other fluid coupling operative, resulting in a very smooth pickup in the drive of one shaft and a smooth termination of the drive of the other shaft.

While the invention has been illustrated in its preferred embodiment, it will be clear to those skilled in the arts to which the invention pertains that many changes and modifications may be made thereto without departing from the scope of the invention.

We claim:

1. A fluid coupling containing working fluid under pressure and comprising, substantially dish-shaped rotatable pump and turbine members facing one another and each having a row of circumferentially spaced blades for rotation of said turbine by the working fluid upon rotation of said pump, a radially disposed annular deformable seal element secured to the blades of one of said members adjacent the blades of the other member and in one position extending across the open face of said one dish-shaped member blocking the circulation of fluid between said pump and said turbine, said seal element being extended axially by the force of the said working fluid under pressure acting thereagainst into the spaces between the blades of the member to which it is secured to permit circulation of fluid through said spaces and from the pump to the turbine, and axially movable means for contacting and returning said seal element to said one position extending across the face of said one dish-shaped member blocking the circulation of fluid through said spaces.

2. A drive device as in claim 1, the working fluid under pressure in said chamber deforming said seal element against the side faces of the blades of the member to which it is secured when said seal element is extended axially whereby said seal member assumes substantially the shape of the member to which it is secured and permits circulation of fluid through said spaces and from said pump to said turbine.

3. A fluid coupling containing working fluid under pressure comprising, substantially dish-shaped rotatable pump and turbine members facing one another, said pump and turbines each having circumferentially spaced blades for rotation of said turbine by the working fluid upon rotation of said pump, a radially disposed annular diaphragm member secured to the axial edge portions of the blades of said pump that are adjacent the turbine and in one position extending across the open face of said pump for blocking the circulation of fluid between said pump and said turbine, said diaphragm member being extended inwardly by the force of the working fluid under pressure acting thereagainst into the spaces between the pump blades to permit circulation of fluid through said spaces and from the pump to the turbine, and axially movable means mounted in the circumferential spaces between the blades of said pump for contacting and returning said diaphragm member to said one position blocking the circulation of fluid through said spaces.

4. A constantly filled dual fluid coupling assembly containing operating fluid under pressure and comprising a rotatable pump member between and fluid connected to axially aligned turbine members to define a pair of spaced fluid chambers, the mutually adjacent portions of said pump and turbine members each having a row of circumferentially spaced blades, a deformable annular fluid sealing element secured to the axial edge portions of the blades of a row in each of said chambers that are adjacent the blades of the other row cooperating therewith and in one position preventing circulation of fluid between the pump and turbine members in each chamber, the operating fluid under pressure in each chamber extending the sealing element therein to a second position permitting circulation of the fluid by the pump member to the turbine member therein for transmission of torque therebetween, and selectively operable actuating means alternately engageable with one or the other of said seal elements for returning one of said seal elements to said one position interrupting the circulation of fluid between the members associated therewith and preventing rotation of one turbine member while simultaneously permitting extension of the other of said seal elements by the operating fluid under pressure in its chamber to said second position permitting circulation of fluid in its chamber to effect a rotation of the other turbine member.

5. A constantly filled dual fluid coupling assembly containing operating fluid under pressure and comprising a rotatable pump member between and fluid connected to axially aligned turbine members to define a pair of spaced fluid chambers, the mutually adjacent portions of said pump and turbine members each having a row of circumferentially spaced blades, and a deformable annular fluid sealing element secured to the axial edge portions of the blades of a row in each of said chambers that are adjacent the blades of the other row cooperating therewith in one position preventing circulation of fluid between the pump and turbine members in each chamber, the operating fluid under pressure in each chamber extending the sealing element therein to a second position permitting circulation of the fluid by the pump member to the turbine member therein for transmission to torque therebetween, and selectively operable reciprocating actuating means alternately engageable with one or the other of said seal elements for returning one of said seal elements to said one position interrupting the circulation of fluid between the members associated therewith and preventing rotation of one turbine member while simultaneously permitting extension of the other of said seal elements by the fluid under pressure in its chamber to said second position permitting circulation of fluid in its chamber to effect a rotation of the other turbine member.

6. A constantly filled dual fluid coupling assembly containing operating fluid under pressure and comprising a rotatable pump member between and fluid connected to axially aligned turbine members to define a pair of spaced fluid chambers, the mutually adjacent portions of said pump and turbine members each having a row of circumferentially spaced blades, and a deformable annular fluid sealing element secured to the axial edge portions of the blades of a row in each of said chambers that are adjacent the blades of the other row cooperating therewith in one position preventing circulation of fluid between the pump and turbine members in each chamber, the operating fluid under pressure in each chamber extending the sealing element therein to a second position permitting circulation of the fluid by the pump member to the turbine member therein for transmission of torque therebetween, and selectively operable reciprocating actuating means alternately engageable with one or the other or said seal elements for returning one of said seal elements to said one position interrupting the circulation of fluid between the members associated therewith and preventing rotation of one turbine member while simultaneously permitting extension of the other of said seal elements by the fluid under pressure in its chamber to said second position permitting circulation of fluid in its chamber to effect a rotation of the other turbine member, the fluid pressure in each of said chambers forcing the seal element therein against the blades of the row of blades therein to which it is secured when said seal element is extended whereby said seal element assumes substantially the shape of the blades to which it is secured.

7. A constantly filled dual fluid coupling assembly containing operation fluid under pressure and comprising a rotatable pump member between and fluid connected to axially aligned turbine members to define a pair of spaced fluid chambers, the mutually adjacent portions of said pump and turbine members each having a row of circumferentially spaced blades, and a deformable annular fluid sealing element secured to the axial edge portions of the blades of a row in each of said chambers that are adjacent the blades of the other row cooperating therewith in one position preventing circulation of fluid between the pump and turbine members in each chamber, the fluid under pressure in each chamber extending the sealing element therein to a second position permitting circulation of the fluid by the pump member to the turbine member therein for transmission of torque therebetween, and selectively operable reciprocating actuating means slidably mounted in the spaces between the blades of the rows of blades to which the seal elements are secured, said actuating means being alternately engageable with one or the other of said seal elements for returning one of said seal elements to said one position interrupting the circulation of fluid between the members associated therewith preventing rotation of one turbine member while simultaneously permitting extension of the other of said seal elements by the fluid under pressure in its chamber to said second position permitting circulation of fluid in its chamber to effect a rotation of the other turbine member, the fluid pressure in each of said chambers forcing the seal element therein against the blades of the row of blades therein to which it is secured when said seal element is extended whereby said seal element assumes substantially the shape of the blades to which it is secured.

8. A constantly filled dual fluid coupling assembly containing operating fluid under pressure and comprising a rotatable pump between and fluid connected to axially aligned turbines to define a pair of spaced fluid chambers, the mutualy adjacent portions of said pump and turbines each having a row of circumferentially spaced blades, and a radially disposed deformable annular fluid sealing element secured to the axial edge portions of each row of pump blades that are adjacent the blades of the turbine cooperating therewith and in one position extending circumferentially across the space between blades for circulation of fluid through said spaces and between said pump and turbines, the operating fluid under pressure in each chamber acting against and extending the sealing element therein to a second position against the blades of the pump to conform the sealing element therein to the pump blade shape whereby fluid in the chamber is circulated through said spaces and by the pump to the turbine therein for transmission of torque therebetween, and selectively operable actuating means slidably mounted in the spaces between said pump blades, said actuating means being alternately engageable with one or the other of said seal elements for returning one of said seal elements to said one position interrupting the circulation of fluid through said spaces and between the members associated therewith to prevent rotation of one turbine while permitting extension of the other seal element by the fluid under pressure in its chamber to said second fluid circulation permitting position effecting a rotation of the other turbine.

9. A dual fluid coupling assembly containing working fluid under pressure comprising, a rotatable pump between axially aligned turbines, the mutually adjacent portions of said pump and turbines each including a row of circumferentially spaced blades for rotation of said turbines by the working fluid upon rotation of said pump, a radially disposed annular diaphragm member secured to the axial edge portions of the blades of each pump row that are adjacent the blades of the turbine cooperating therewith in one position blocking the circulation of fluid between said pump and said turbines, said diaphragm members each being extendable inwardly to a second position by the force of working fluid under pressure thereagainst into the spaces between the pump blades associated therewith to permit circulation of fluid through said spaces and from the pump to the turbines, and an axially movable member mounted between said diaphragm members in the circumferential spaces between the blades of said pump for contacting and returning said diaphragm members to said one position blocking said circulation of fluid, said movable member being of an axial length less than the axial width of said pump whereby movement of said movable means in one direction to engage one of said diaphragm members to return it to said one fluid circulation blocking position disengages said movable member from the opposite diaphragm member permitting the fluid under pressure to extend said opposite diaphragm member to said second fluid circulation permitting position.

References Cited by the Examiner
UNITED STATES PATENTS

| 1,085,818 | 2/14  | Oxnard _____ 92—99 X |
| 2,258,302 | 10/41 | Ronning _____ 60—54  |
| 2,674,905 | 4/54  | O'Brien _____ 60—54 X |
| 2,995,897 | 8/61  | Parrish et al. _____ 60—54 |

JULIUS E. WEST, *Primary Examiner.*

UNITED STATES PATENT OFFICE
CERTIFICATE OF CORRECTION

Patent No. 3,214,912                        November 2, 1965

Martin G. Gabriel et al.

It is hereby certified that error appears in the above numbered patent requiring correction and that the said Letters Patent should read as corrected below.

Column 1, line 58, for "elments" read -- elements --; column 3, line 40, strike out "of one coupling unit at a time, or partial opera-" and insert instead -- with one or the other shrouds 30 or 32. Each --; line 43, for "illustrating" read -- illustrated --; column 6, line 63, for "to", second occurrence, read -- of --; column 7, line 17, for "or" read -- of --; line 31, for "operation" read -- operating --; column 8, line 2, for "mutualy" read -- mutually --; line 9, after "for" insert -- preventing --.

Signed and sealed this 23rd day of August 1966.

(SEAL)
Attest:

ERNEST W. SWIDER
Attesting Officer

EDWARD J. BRENNER
Commissioner of Patents